US006232977B1

(12) United States Patent
Chen

(10) Patent No.: US 6,232,977 B1
(45) Date of Patent: *May 15, 2001

(54) RENDERING PERSPECTIVE VIEWS OF A SCENE USING A SCANLINE-COHERENT LOOK-UP TABLE

(75) Inventor: Shenchang Eric Chen, Saratoga, CA (US)

(73) Assignee: MGI Software Corporation, Richmond Hill (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/009,652

(22) Filed: Jan. 20, 1998

Related U.S. Application Data

(63) Continuation of application No. 08/647,018, filed on May 8, 1996, now Pat. No. 5,748,194.

(51) Int. Cl.$^7$ .................................................. G06F 15/00
(52) U.S. Cl. .............................................................. 345/425
(58) Field of Search .................................. 345/422, 425, 345/419, 418, 117, 118

(56) References Cited

U.S. PATENT DOCUMENTS

| | | | |
|---|---|---|---|
| 4,763,280 | 8/1988 | Robinson et al. | 364/518 |
| 4,811,245 | 3/1989 | Bunker et al. | 364/521 |
| 4,841,292 | 6/1989 | Zeno | 340/736 |
| 5,396,583 | 3/1995 | Chen et al. | 395/127 |
| 5,446,833 | 8/1995 | Miller et al. | 395/125 |

OTHER PUBLICATIONS

"Image Description and 3–D Reconstruction From Image Trajectories of Rotational Motion" Sawhney, et al., IEEE Transactions on Pattern Analysis and Machine Intelligence, vol. 15, No. 9, Sep. 1993, pp. 885–898.

"Parallel Algorithms For Visualizing Image Surfaces", Image Processing and Its Applications, 1989, pp. 472–476.

"Stream Processing Architecture for Real–Time Implementation of Perspective Spatial Transformations", Evemy, et al., IEEE Proceedings, vol. 137, No.3, Jun. 1990.

"Mapping Arbitrary Projections for Volume Rendering Onto An Array Processor", Lu, et al., International Conference On Application–Specific Array Processors pp. 160–163, Oct. 1993.

Second Edition, Computer Graphics, Principles and Practice, Section 6.1, J.D. Foley, et al., Addison–Wesley Publishing Company, 1990.

*Primary Examiner*—Phu K. Nguyen
(74) *Attorney, Agent, or Firm*—Blakely, Sokoloff, Taylor & Zafman

(57) ABSTRACT

A method for preparing a presentation of a perspective view of a scene based upon an environment map representing the scene and having environment map indices, which presentation interactively displays viewing planes at any orientation, said viewing planes having scanlines, the method including generating a look-up table tabulating the environment map indices, the look-up table being characterized in that each of the scanlines of the viewing planes corresponds to information within a scanline of the look-up table, and storing the look-up table. A system is also described and claimed.

8 Claims, 12 Drawing Sheets

RENDERING PERSPECTIVE VIEWS OF A SCENE USING A SCANLINE-COHERENT LOOK-UP TABLE

This application is a continuation of U.S. patent application Ser. No. 08/647,018, filed May 8, 1996, now U.S. Pat. No. 5,748,194.

BACKGROUND OF THE INVENTION

1. Field of the Invention

The present invention relates to the field of image construction. More particularly, the present invention relates to the field of computerized rendering of perspective views of a environment map onto a display.

2. Art Background

Virtual reality encompasses a wide variety of sensual input and output techniques for immersing a human operator in a computer-synthesized virtual environment. A subset of virtual reality, termed virtual environment navigation, is related to the generation of visual images corresponding to what a virtual camera sees while moving in the virtual environment. To maintain the sensation of virtual reality, the generation of views of the virtual environment must be performed in real-time in response to operator input.

One method of virtual environment navigation is accomplished by constructing a virtual environment using three-dimensional (3D) objects, placing a virtual camera in the virtual environment under an operator's control, and then presenting views to a human operator via a real-time rendering process which is analogous to photography. This method of virtual environment navigation suffers from several disadvantages. First, constructing virtual environments from 3D geometric objects is a laborious process and is very difficult to automate. Also, rendering 3D geometric objects in real-time usually requires specialized 3D rendering hardware. Further, the rendering time varies with the number of geometric objects in the scene, making it difficult to maintain real-time performance in scenes having a large number of geometric objects.

Another technique for navigating virtual environments has been developed in which views seen by a virtual camera are generated by processing digitized panoramic images known as environment maps. An environment map may be created by sampling a three-dimensional (3D) scene in parametric increments along a surface of revolution defined by rotating a profile curve about an axis. Examples of surfaces of revolution include spheres, cylinders, cones, etc. Since points on the surface of revolution are used to define points in the scene which in turn are sampled to obtain intensity values ultimately stored in an environment map, environment maps are commonly referred to by the geometry of the surface of revolution. For example, a spherical environment map can be created by incrementing angular parameters (e.g., angles of latitude and longitude) defining points along the surface of a sphere. Points sampled from the scene are defined by vectors extending from the viewpoint of a virtual camera (typically at the center of the sphere) through the spherical surface points and into the scene. By sampling each such point in the scene to obtain a pixel value, a rectangular pixel map is obtained in which offsets along each axis correspond to respective angular sampling increments. Depending on the nature of the surface of revolution used to establish parametric sampling increments, the environment map may represent a complete or partial view of the 3D scene. Since an environment map represents a scene perceived from a particular viewpoint, perspective views of arbitrary orientation and field of view can be generated by retrieving the appropriate pixel data from the environment map and presenting it on a display. This is termed rendering the environment map.

Rendering an environment map is complicated by the fact that straight lines in a scene may not be preserved (i.e., they may become curved) when the scene is sampled to produce the environment map. This distortion must be corrected before an accurate perspective view can be presented to a human operator. Because the correction required is dependent on the orientation of the perspective view, the correction must be performed on-the-fly when a user is interactively rotating or zooming the virtual camera.

One method for interactively rendering an environment map is disclosed by Miller et al. in U.S. Pat. No. 5,446,833 (Miller). In this approach, a two-level indexing scheme is used to provide two axes of rotation in the generation of perspective views of a spherical environment map. Miller employs a screen look-up table to permit rotation of the perspective view about a horizontal axis. The values read from the screen look-up table are themselves used to index a parametric look-up table. The parametric look-up table permits rotation of the perspective view about the polar axis of a sphere and contains indices to the spherical environment map. One disadvantage of this approach is that three different data stores must be read in order to generate a perspective view: the screen look-up table, the parametric look-up table, and finally the spherical environment map itself.

Another method for interactively rendering an environment map is disclosed by Chen et al. in U.S. Pat. No. 5,396,538 (Chen). In this approach, the rendered environment map is based on a cylindrical surface projection and is referred to as a cylindrical environment map. A cylindrical environment map provides a 360° field-of-view around the center axis of the cylinder and a more limited field-of-view vertically. Chen employs a two-step approach to render the environment map. In the first step, the axial scanlines on the cylindrical surface are mapped to a vertical plane having scanlines parallel to those on the cylindrical surface. This step is termed vertical scaling. In the second step, termed horizontal scaling, the vertical plane is mapped to the viewing plane. One disadvantage of this approach is that an intermediate image must be constructed in the vertical scaling step, requiring additional time and buffer space. Another disadvantage of this approach is that it is limited to use with a cylindrical environment map and therefore has a restricted vertical field of view.

As is apparent from the preceding discussion, environment map rendering can be quite complex and requires either large look-up tables or significant amounts of computational power. Further, other rendering functions, such as anti-aliasing require additional computational power. In most personal computer systems, the effect of such resource demands is to limit the rate at which perspective views may be rendered, resulting in an undesirable delay between selection and rendering of a perspective view.

It would be desirable, therefore, to provide a technique for rendering an environment map obtained based on a surface of revolution of generalized geometry in a manner which allows perspective views to be rapidly rendered without restricting the field of view and without requiring inordinate computational power or memory. This is achieved in the present invention.

SUMMARY

A method and apparatus for generating perspective views of a scene represented by an environment map is disclosed.

With a viewing position at the center of a surface of revolution used to map the scene into an environment map, different views of the scene may be rendered by rotating the viewing direction either horizontally or vertically. A horizontal rotation will cause panning of the scene from "side to side". A vertical rotation will cause panning of the scene "up or down". Depending on the geometry of the surface of revolution, panning may be unrestricted or may be restricted in either the vertical or horizontal directions. A scanline-coherent look-up table is used to provide environment map indices according to the degree of vertical rotation of the view, while horizontal rotation is provided by offsetting the environment map indices obtained from the scanline-coherent look-up table. By translating the address of look-up table entries according to vertical rotation and translating the address of environment map entries according to horizontal rotation, perspective views of a scene may be generated quickly and accurately without the need to buffer an intermediate image.

The generation of a perspective view of a scene involves the computer-implemented steps of: providing an environment map containing pixel values representing the scene; generating a scanline-coherent look-up table containing environment map indices ordered in scanlines; mapping a viewing plane, also ordered in scanlines, to a portion of the look-up table based on a pitch angle, the viewing plane being mapped scanline for scanline with the portion of the look-up table; locating pixel values in a portion of the environment map based on a yaw angle and based on the environment map indices stored in the portion of the look-up table to which the viewing plane is mapped; writing the located portion of pixel values into the viewing plane; and rendering the viewing plane onto a display.

DETAILED DESCRIPTION OF THE PREFERRED EMBODIMENT

A method and apparatus for rendering perspective views of a scene using a scanline-coherent look-up table are described. In the following description, numerous specific details are set forth in order to provide a thorough understanding of the present invention. It will be apparent to one skilled in the art, however, that the present invention may be practiced without such specific details.

Overview Of Rendering Method Of The Preferred Embodiment

Figure 1:
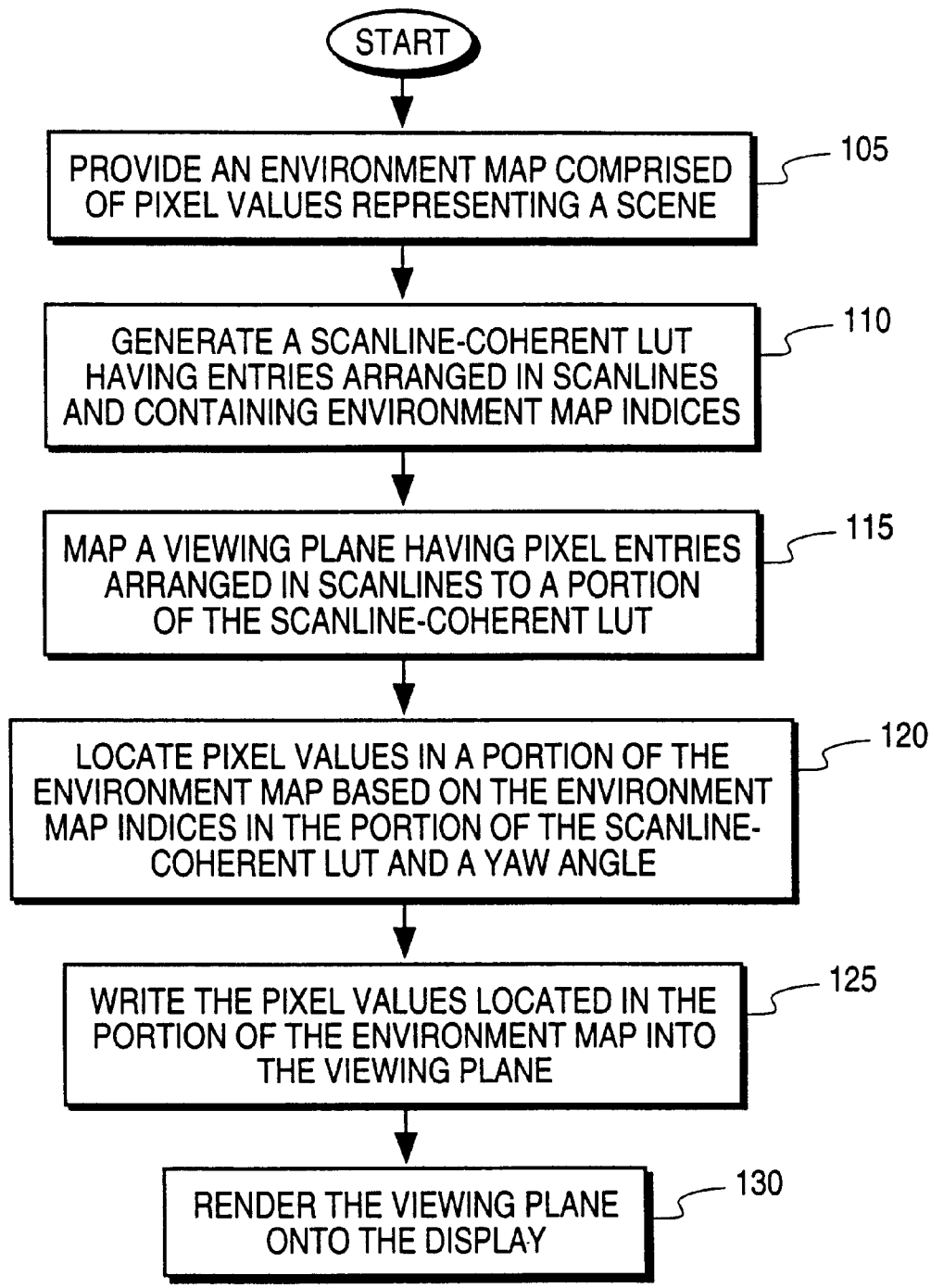
FIG. 1 depicts a flow chart in accordance with the present invention.

FIG. 1 illustrates a flowchart 100 in accordance with the method of the present invention. At step 105 an environment map containing pixel values representing a 3D scene is provided. The environment map is produced by sampling the scene at points defined by vectors extending from a viewpoint within the scene through parametrically incremented points on a surface of revolution. Conceptually, the scene is said to be projected onto the surface. The surface of revolution is defined by rotation of a profile curve partly or completely around an axis. For example, rotating a semi-circle completely around an axis yields a spherical surface, rotating a semi-circle halfway around an axis yields a hemi-spherical surface, rotating a right triangle completely around an axis yields a conical surface, rotating a line parallel to an axis of rotation completely around the axis yields a cylindrical surface, etc.. At step 110 a scanline-coherent look-up table (LUT) is generated based on the geometry of the surface of revolution used to produce the environment map. The scanline-coherent look-up table is organized in rows of storage locations referred to as scanlines to emphasize their relation to the scanlines of a viewing plane. Each scanline of the scanline-coherent look-up table contains a plurality of environment map indices used to locate pixel values within the environment map. At step 115 a viewing plane, also arranged in scanlines, is mapped to a portion of the scanline-coherent look-up table by mapping scanlines of the viewing plane to a portion of the scanlines in the look-up table. The term viewing plane generally refers to a display screen or a portion of a display screen on which a view is presented, but may also be represented by a memory such as a frame buffer or pixel buffer for storing pixel values prior to display. In any case, in order to be displayed, pixel values read from the environment map are written to the viewing plane. The portion of scanline-coherent look-up table scanlines to which the viewing plane scanlines are mapped is determined by a pitch angle which has been entered by a user or obtained from another source such as a concurrently executing computer program or a data file. At step 120 pixel values stored in a portion of the environment map are located based on a yaw angle and the environment map indices obtained from the portion of the scanline-coherent look-up table to which the viewing plane is mapped. Like the pitch angle, the yaw angle may be entered by a user or obtained from another source. At step 125 the pixel values located in step 120 are written into the viewing plane and at step 130 the viewing plane is displayed.

Computer System Overview

Figure 2:
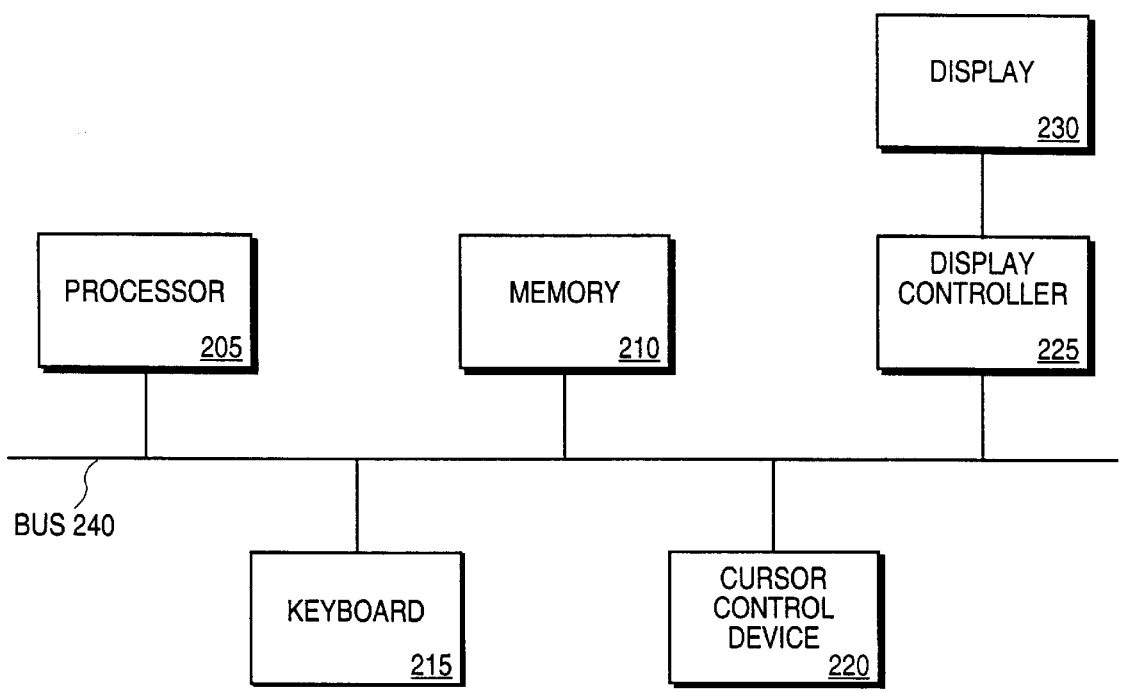
FIG. 2 is a block diagram of a computer system as may be utilized by the preferred embodiment of the present invention.

FIG. 2 illustrates a general purpose computer system 200 for performing the individual steps of the method of the present invention. The computer system includes a processor 205, memory 210, keyboard 215, cursor control device 220, and display controller 225, each coupled to a bus 240. The computer system also includes a display 230 coupled to display controller 225. In the preferred embodiment, display 230 is a high resolution color monitor, although a high resolution monochrome monitor may also be used. Processor 205 fetches instructions stored in memory 210 via bus 240 and executes the instructions to perform operations on data, which is also stored in memory 210. Execution of certain sequences of instructions by processor 205 results in processor 205 writing data to display controller 225 to present an image on display 230.

Memory 210 includes both operating memory (e.g., random access memory) and non-volatile storage such as a read-only-memory, hard disk-drive, floppy disk-drive or some other computer-readable medium. When power is applied to the computer system 200, an operating system (OS) is loaded from non-volatile storage into operating memory by processor 205 or another device, such as a direct memory access controller (not shown), having access to memory 210. Sequences of instructions comprised by the OS are then executed by processor 205 to load other computer programs and portions of computer programs into operating memory from non-volatile storage. The present invention may be embodied in a sequence of instructions which can be stored in a computer readable medium and executed by processor 205.

In the preferred embodiment, display controller 225 contains a frame buffer (not shown) into which processor 205 writes pixel values before they are displayed on display 230. A graphics accelerator (not shown) may also be used to increase the rate at which images are displayed on display 230. Cursor control device 220 may be a mouse, trackball or other device for manipulating a cursor on display 230. Both the cursor control device 220 and the keyboard 215 enable the computer system 200 to receive input from a computer-user.

It should be noted that the individual method steps of the present invention may be performed by a general purpose processor programmed with instructions that cause the processor to perform the recited steps (as described above), specific hardware components that contain hard-wired logic for performing the recited steps, or any combination of programmed general purpose computer components and custom hardware components may also be used. Nothing disclosed herein should be construed as limiting the present invention to a single embodiment wherein the recited steps are performed by a specific combination of hardware components.

Figure 3:
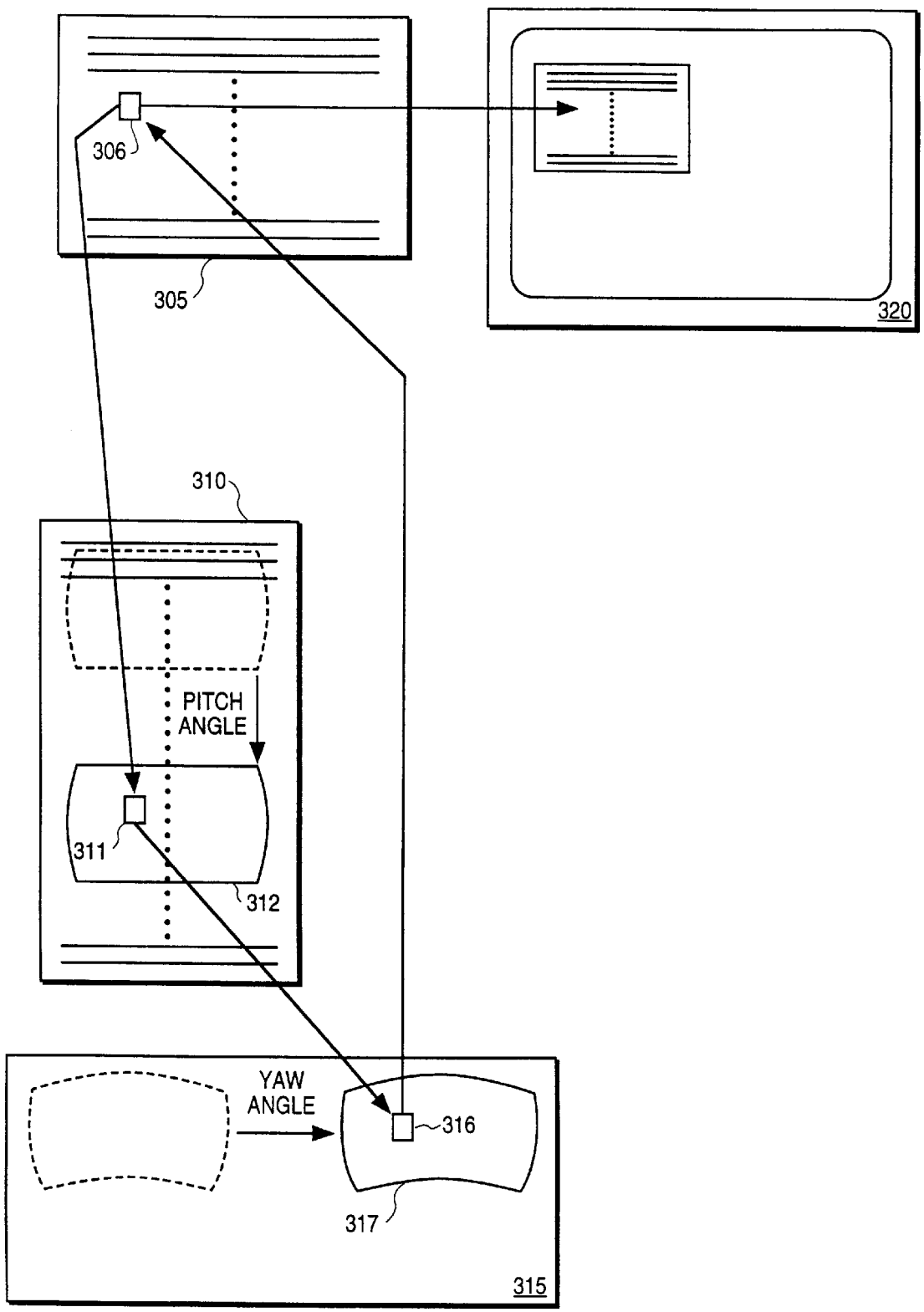
FIG. 3 illustrates the interrelationship between an environment map, scanline-coherent look-up table, pixel buffer and display in accordance with the present invention.

FIG. 3 illustrates the relationship between a display 320, pixel buffer 305, scanline-coherent look-up table 310, and environment map 315. Pixel values stored in the pixel buffer 305 are used to present an image on the display 320. The pixel values stored in the pixel buffer may be represented by color values in any number of formats such as RGB or YIQ, or the pixel values may be represented by color index values used to address a color look-up table containing RGB, YIQ or other color values. Environment map 315 indices are read from a storage location 311 within the scanline-coherent look-up table 310 and are used to locate a pixel value 316 within the environment map 315. The look-up table storage location 311 corresponds to a pixel buffer storage location 306 by virtue of the mapping of the pixel buffer 305 to a portion of the look-up table 310 described in reference to FIG. 1, step 115. The portion 312 of the look-up table 310 to which the pixel buffer 305 is mapped is shown is offset within the look-up table 310 based on the pitch angle of the perspective view. The complete environment map column offset of the pixel value 316 will be determined by both the column index read from look-up table storage location 311 and a yaw angle. Once located, the pixel value 316 is stored in the pixel buffer 305 at storage location 306 and the successive storage locations within the pixel buffer are filled in a similar manner. Pixel values in the portion 317 of the environment map 315 located using indices stored in the portion 312 of the look-up table 310 are each offset in the environment map 315 based on the yaw angle. In the preferred embodiment, environment map indices are read from the scanline-coherent look-up table 310 for one out of every four pixel values stored in the pixel buffer 305. The environment map indices for the remaining three pixel values are obtained by interpolating between successive index pairs obtained from the look-up table 310. Generally, each of the pixel values are loaded from the environment map into the pixel buffer as follows:

$$\text{Pixel}_n = \text{Environment Map } (r_n, c_n + f(\phi)),$$

where n ranges from 0 to the number of pixel values which to be stored in the pixel buffer minus one, r and c are the row and column indices obtained from the scanline-coherent look-up table 310 (either directly or by interpolation) for the respective pixel buffer location, and+is a yaw angle. The term $f(\phi)$ denotes a function that maps $\phi$ to a column index. For an environment map with a 360° horizontal field of view and width w, for example, $f(\phi)=(\phi/2\pi) * w$. The entire pixel buffer is filled in this manner and the contents of the pixel buffer are then used to drive the display.

Generating a Scanline-Coherent Look-up Table Containing Environment Map Indices

Generation of a scanline-coherent look-up table which may be employed to render an environment map is described below. For the purpose of this description, a spherical environment map and a cylindrical look-up table are used. However, environment maps based on other surface geometries including cones, cylinders, etc. may be used, and look-up tables based on any surface of extrusion such as a cylinder, cuboid, rhomboid, wedge, etc., or any portion of a surface of extrusion such as a plane, may be used. Nothing disclosed herein should be construed to limit the present invention to an embodiment based on a particular surface geometry.

Figure 4:
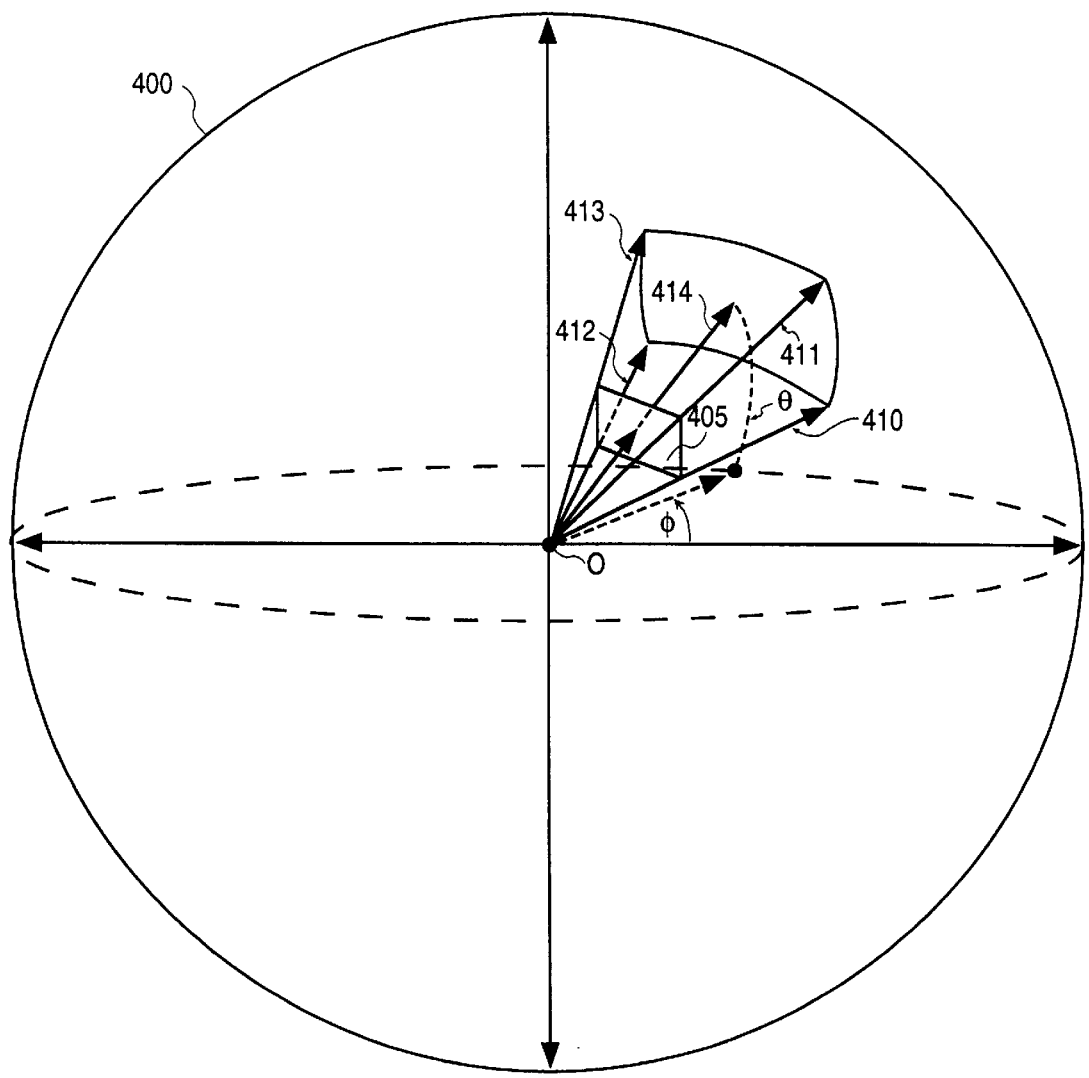
FIG. 4 illustrates the relationship between a viewing plane and a sphere.

FIG. 4 depicts a sphere 400 representing the surface projection of a scene from which an environment map may be obtained. A perspective view of the scene can be generated by projecting direction vectors 410–414 from the center of the sphere 400 at point O through a viewing plane 405 onto the surface of the sphere 400. The spherical surface points indicated by the direction vectors 410–414 are referred to herein as image points. Although only five direction vectors are shown, this is for clarity only and the density of direction vectors used to sample the scene projected onto sphere 400 is much greater in actual implementation.

For a given set of points P'(x, y) in the viewing plane of a perspective view, the polar coordinates of corresponding spherical surface points P($\phi$, $\theta$) may be computed. Because the (u, v) offset locations in a spherical environment map correspond linearly to the polar coordinates ($\phi$, $\theta$) on the surface of the sphere 400, the polar coordinates ($\phi$, $\theta$) may be used to locate pixel values stored in the environment map.

Each perspective view of the scene projected onto sphere 400 may be described in terms of the polar coordinates ($\phi$, $\theta$) of the center direction vector 414 extending from the viewpoint O through the center of the viewing plane 405. The angle of rotation of center direction vector 414 about the polar axis of the sphere 400, $\phi$, is referred to as the yaw angle of the perspective view. The $\phi$ coordinate of each of the image points is equal to the yaw angle of the perspective view plus a respective angular offset which is independent of the yaw angle of the perspective view. That is, for a given pitch angle ($\theta$) of the perspective view, the $\phi$ coordinates of the image points remain fixed in relation to one another. A change in the yaw angle of the perspective view, therefore, may be rapidly effectuated by incrementing the column indices (u) of the previously located environment map pixel values by an amount proportional to the change in yaw angle. Conceptually, the effect of changing the yaw angle of the perspective view is to translate the locations of the set of pixel values to be read from the environment map right or left in the environment map, while maintaining their positions relative to one another. Changing the pitch angle of the perspective view is more complicated. As will be expressed analytically below, the polar coordinates ($\phi$, $\theta$) of the image points change relative to one another as a function of the pitch angle of the perspective view. Thus, in the purely analytical implementation, each change in pitch angle requires that the set of polar coordinates ($\phi$, $\theta$) corresponding to the new perspective view be recomputed based on the geometric relationship between the viewing plane coordinates and polar coordinates, rather than exploiting a simple offset relationship as is possible when only the yaw angle is changed. Recomputation of the ($\phi$, $\theta$) coordinates of the spherical surface points corresponding to the (x, y) coordinates of the viewing plane each time the pitch angle of the perspective view is changed requires significant computational power and tends to noticeably reduce the rate at which perspective views can be rendered on most systems.

In the present invention, the number of computations necessary to render perspective views of varying pitch and yaw is significantly reduced by generating a look-up table containing precomputed coordinates which can be used to locate pixel values in the environment map. The viewing plane is mapped to a portion of the look-up table values based on the pitch angle of the perspective view and the polar coordinates of the spherical surface points are looked-up rather than computed anew. As the pitch angle of the perspective view is changed, the mapping of the viewing plane to the look-up table is also changed. By constructing the look-up table based on a surface geometry having an axis of extrusion parallel to scanlines in the viewing plane, the remapping of the viewing plane to the look-up table becomes significantly more efficient than a full recomputation of the polar coordinates of the spherical surface points corresponding to the (x, y) coordinates of the viewing plane. Conceptually, a change in pitch angle results in a translation, up or down, of the portion of the look-up table to which the viewing plane is mapped. The polar coordinates read from the portion of the look-up table are used to locate pixel values in the environment map, and the yaw angle of the perspective view is used to determine the horizontal offset of the locations of the pixel values in the environment map as described above.

Figure 5:
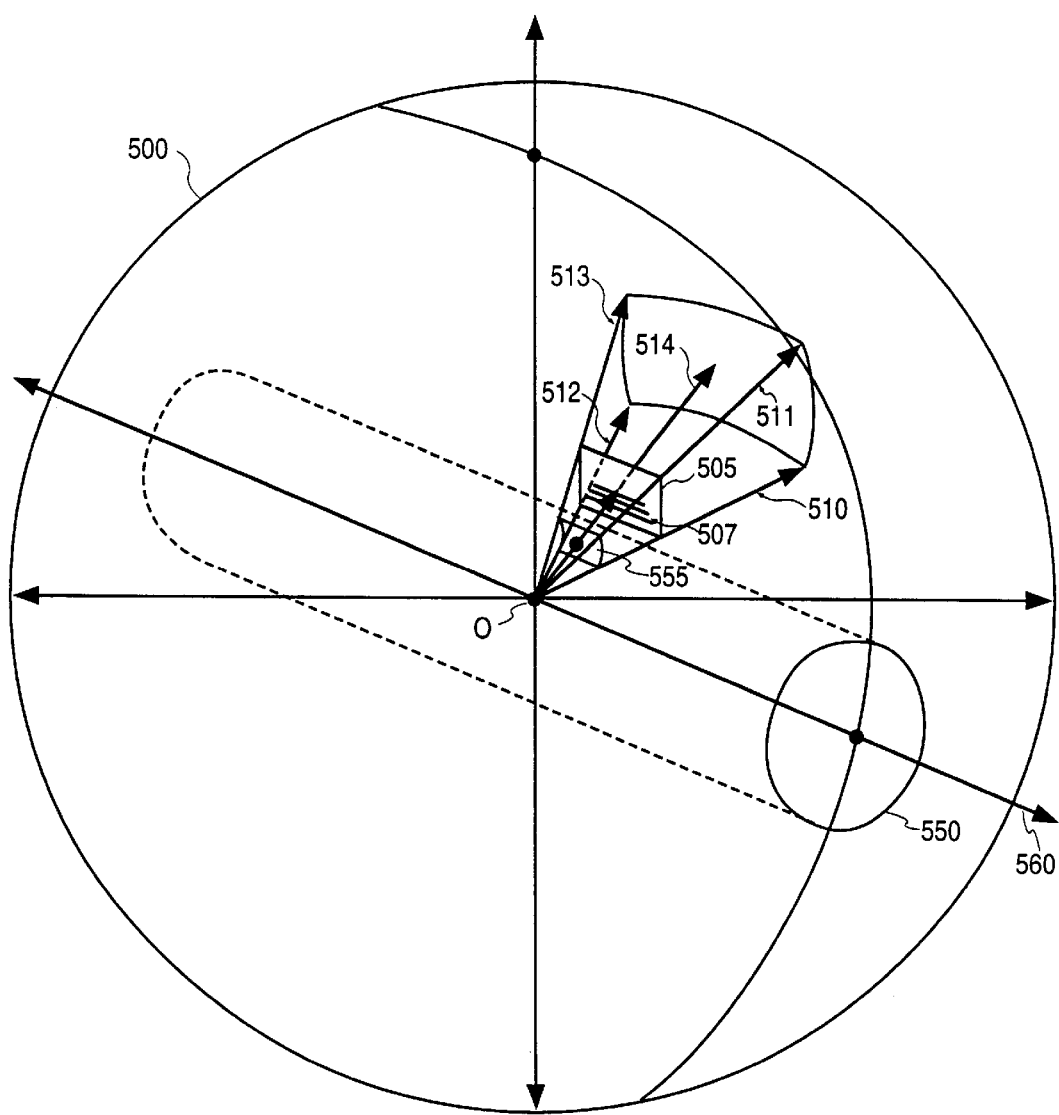
FIG. 5 illustrates the relationship between a viewing plane and a scanline-coherent surface contained within a sphere.

FIG. 5 illustrates a sphere 500 containing a cylinder 550, wherein both the sphere 500 and the cylinder 550 are centered at point O. As in FIG. 4, a perspective view of the scene projected onto sphere 500 is generated by projecting direction vectors, 510–514 from point O through a viewing plane 505 onto the surface of sphere 500. The direction vectors 510–514 also intersect the surface of the cylinder 550, thereby defining area 555. Imagining that cylinder 550 could be unrolled to form a rectangle, referred to herein as a surface rectangle, it is apparent that coordinates of surface points on cylinder 550 could be represented as coordinates of points P(x, y) on the surface rectangle. The unrolled cylinder may be represented by a look-up table, hence a cylindrical look-up table, in which coordinates of points P(x, y) on the surface rectangle correspond to offsets (x, y) into the look-up table. Since the cylinder allows a full 360° of perspective view pitch, the polar coordinates of points on sphere 500 may be stored in the cylindrical look-up table at the corresponding (x, y) coordinate of the cylindrical surface point for a full revolution of the sphere 500 in the direction of the perspective view pitch angle. Thus, when the pitch angle of the perspective view is changed, the polar coordinates corresponding to the new perspective view may be obtained by reading the ($\phi$, $\theta$) coordinates of the environment map data from the appropriate location within the cylindrical look-up table. Furthermore, by virtue of the cylindrical geometry and by orienting cylinder C such that its axis of extrusion 560 is parallel to the scanlines 507 of the viewing plane 505, the scanlines 507 of the viewing plane 505 map one for one to rows (or pairs of rows) within the cylindrical look-up table. This property is referred to as scanline coherence, and a look-up table based upon a cylindrical geometry is but one instance of the more general class of look-up tables referred to as scanline-coherent look-up tables. Depending on the nature and extent of the scenic views to be rendered and on the particular capabilities of the hardware platform used, a scanline-coherent look-up table based on a plane, rhomboid (diamond shaped cross-section), cuboid or other surface of extrusion (or portion thereof) may be desirable. In any case, by virtue of scanline coherence between the viewing plane and look-up table, the viewing plane 505 may be mapped to the look-up table on a scanline by scanline basis.

Figure 6A:
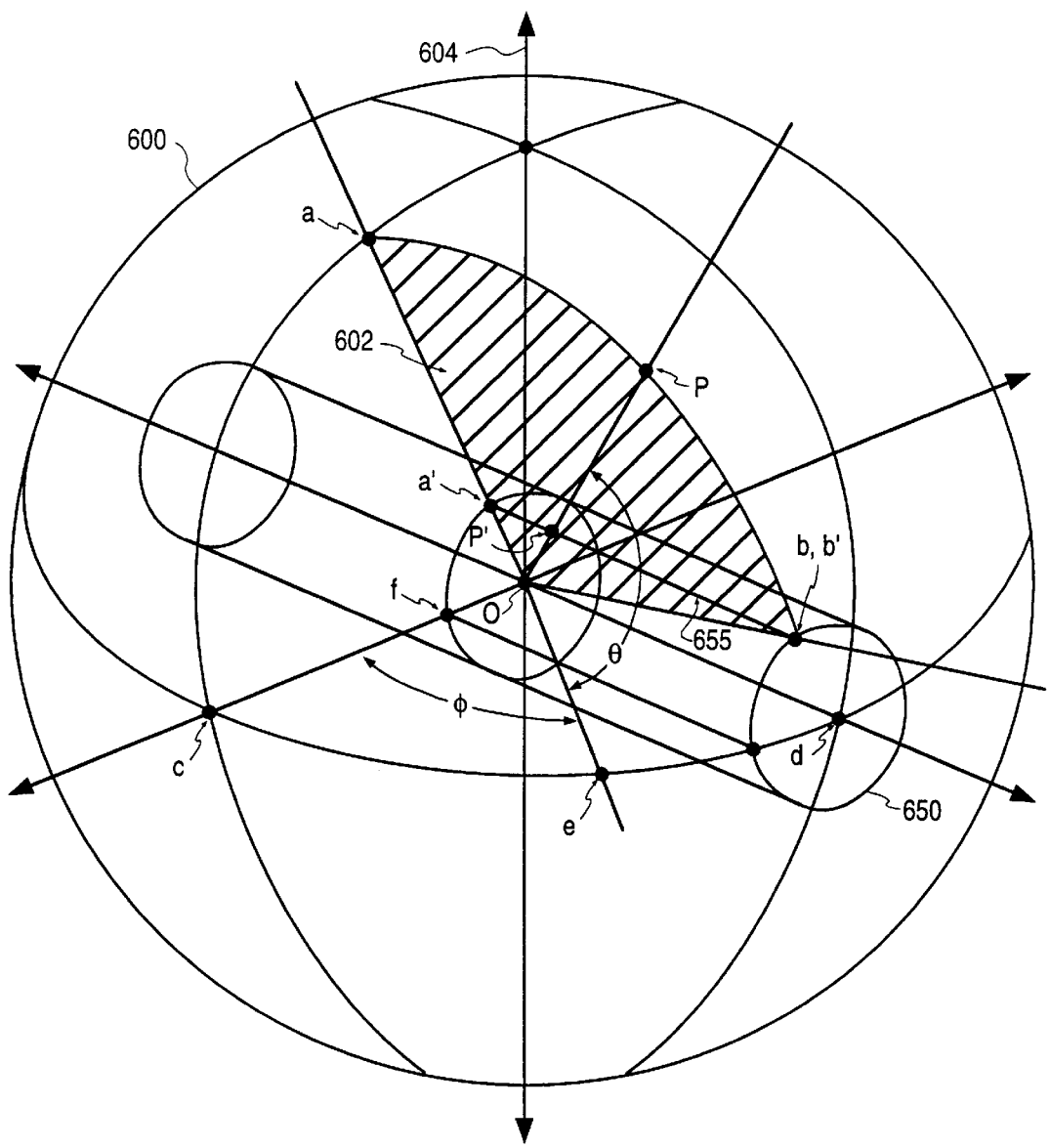
FIG. 6A illustrates the geometrical relationship between a scanline on the surface of a cylinder contained within a sphere and the projection of the scanline onto the surface of the sphere.

FIG. 6A illustrates the relationship of a point P on a sphere 600 to a point P' on the surface of cylinder 650. As in FIGS. 4 and 5, point O represents the perspective view point. Points (O, a', b') define a plane 602 (depicted as a shaded region) which intersects the sphere 600 along the arc defined by points (a, P, b) and which also intersects the surface of cylinder 650 at points (a', P', b'). Points (a', P', b'), or any two of them, define a scanline 655 along the cylindrical surface which corresponds to a scanline in a cylindrical look-up table. By computing the polar coordinates ($\phi$, $\theta$) for each point along arc (a, P, b) corresponding to a point along scanline 655, the polar coordinates corresponding to the entire scanline 655 can be mapped.

Point P on the surface of sphere 600 is the endpoint of a direction vector extending from point O, and is identified by polar coordinates ($\phi$, $\theta$). Note that the spherical radius is normalized. The angle $\phi$ is defined by points (c, O, e), and the angle $\theta$ is defined by points (e, O, P). Two other angles, α and δ, are helpful to develop an analytical expression of coordinates (φ, θ) of point P in terms of coordinates (x, y) of point P'. Angle α represents the pitch angle of scanline (a', P', b') and is defined by points (c, O, a). Conceptually, angle α is the angle between planes (O, a', b') and (O, c, d). Angle δ is defined by points (a', O, b') and represents the field of view of the spherical surface defined by the intersection of plane (O, a', b') with the spherical surface. The angle 2*δ is the maximum field of view that can be presented in a perspective view based on a look-up table derived from mapping cylinder 650 to sphere 600. For a cylinder having a fixed radius, angle δ is constant.

Figure 6B:
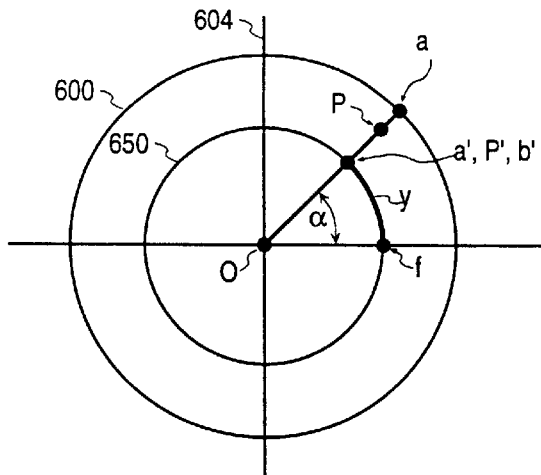
FIG. 6B depicts a side view of the sphere and cylinder of FIG. 6A.
Figure 6C:
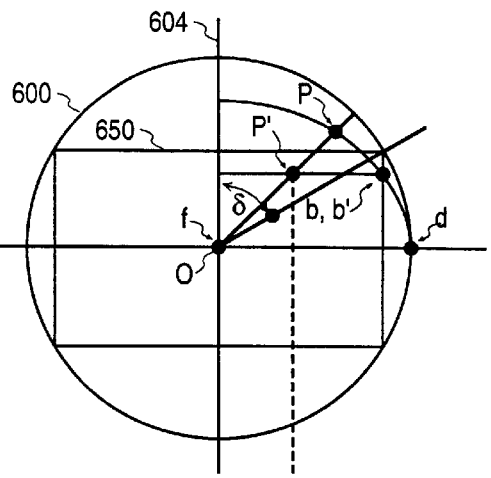
FIG. 6C depicts a front view of the sphere and cylinder of FIG. 6A.
Figure 6D:
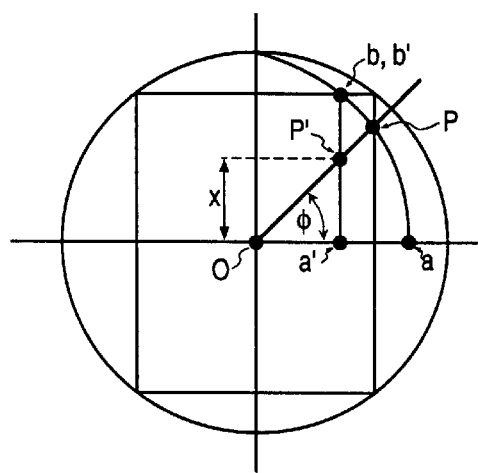
FIG. 6D depicts a top view of the sphere and cylinder of FIG. 6A.
Figure 6E:
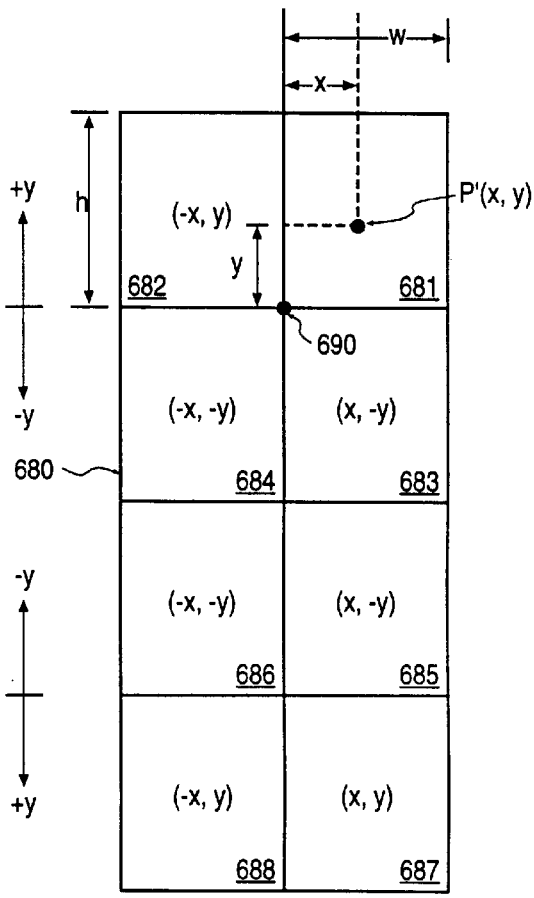
FIG. 6E illustrates the manner in which points on the surface of a cylinder within a sphere correspond to entries in a look-up table.

FIGS. 6B, 6C and 6D present the sphere 600 and cylinder 650 of FIG. 6A, but from different vantage points. FIG. 6B depicts the sphere 600 and cylinder 650 from a vantage point collinear with the axis of rotation of the cylinder 650 (side view) and FIG. 6C depicts the sphere and cylinder from a vantage point perpendicular to that of FIG. 6B and collinear with line (O, c) of FIG. 6A (front view). FIG. 6D depicts the sphere 600 and cylinder 650 from a vantage point collinear with the polar axis 604 of sphere 600 (top view). FIG. 6E depicts the a surface rectangle 680 resulting from the unrolled cylindrical surface. FIG. 6E is positioned relative to FIG. 6C to emphasize the geometrical relationship between (x, y) coordinates on the surface rectangle 680 and points on the spherical and cylindrical surfaces.

As will be discussed further below, coordinates of only one-eighth of the sphere 600 are computed and stored in a cylindrical look-up table so that only the shaded one-eighth region 681 of the surface rectangle 680 corresponds to the look-up table. Coordinates of locations within the shaded one-eighth region 681 of the surface rectangle 680 correspond to offsets within the look-up table. The overall height of the shaded one-eighth region 681 of the surface rectangle 680 is equal to $\pi*r/2$ (one-fourth of the circumference of the cylinder having a radius r) and is designated h. The width of the shaded one-eighth region 681 of the surface rectangle 680 is designated w and is equal to the distance from point a' to point b'. Note that for a given cylinder C, radius r, width w and height h are constant The coordinates of point P(φ, θ) on the surface of sphere 600 can be expressed in terms of look-up table offsets x and y and constants δ and w as follows:

r=w/tan (δ),

α=y/r, tan (φ)=x/(r*cos (α)), so that:

φ=$\tan^{-1}$ (x/(r*cos (α)))=$\tan^{-1}$ (x/(r*cos (y/r)))

Also, tan (φ)=tan (α)*cos (φ), so that

θ=$\tan^{-1}$ (tan (α) * cos (φ)=$\tan^{-1}$ (tan (y/r) * cos (φ))

Given the foregoing expressions for coordinates (φ, θ) as a function of look-up table offsets (x, y), coordinates (φ, θ) may be computed for each of the entries (x, y) in the cylindrical look-up table. In the preferred embodiment, the coordinates (φ, θ) are normalized (to range between 0 and 1) and then multiplied by the width and height of the environment map before being stored in the cylindrical lookup table.

Although the expressions for mapping coordinates on a surface of revolution have been developed for a sphere, as stated above, expressions for mapping surfaces of revolution of different geometry are within the spirit and scope of the present invention. For example, instead of storing (φ, θ) in the scanline-coherent look-up table to map a spherical environment map, a cylindrical environment map may be mapped by storing points (φ, tan θ), where φ is the angle about the axis of rotation of a cylindrical surface. Also, a sine-distribution environment map obtained from a surface of revolution compressed near the poles may be mapped by storing (φ, sin θ) in the cylindrical look-up table. In fact, any function of the pitch angle θ can be stored in the look-up table to define a profile curve which, when rotated partly or completely about an axis, itself defines a surface of revolution from which an environment map may be obtained.

As stated above, coordinates of only one-eighth of the surface of sphere 600 need be computed and stored in the cylindrical lookup table. By virtue of spherical symmetry, the one-eighth of the sphere 600 (of FIG. 6C) mapped in the look-up table is sufficient to render perspective views encompassing the remaining seven-eighths of the sphere 600. Initially, it will be appreciated that, since a full 360° of yaw rotation is permitted, only 180° of pitch rotation is required. Referring to the surface rectangle depicted in FIG. 6E, this means that the lower one-half of the surface rectangle is simply a reflection of the upper one-half so that environment map indices stored in a look-up table corresponding to the surface rectangle regions 681, 682, 683 and 684 are simply reflected copies of the coordinates that would be stored for regions 687, 688, 685 and 686, respectively. Consequently, regions 685–688 need not be mapped and coordinates stored for the upper one-half of the surface rectangle are sufficient to render views for both sides of the sphere 600.

Regions 681–684 represent the four quadrants of the face of cylinder 650 shown in FIG. 6C and share a common origin at point 690. (Point 690 corresponds to point f on the surface of cylinder 650 shown in FIGS. 6A, 6B and 6C.) As a consequence of symmetry about point 690, environment map indices stored in region 681 have the same magnitude as those stored in regions 682, 683 and 684, but with one or both signs inverted. Consequently, if row and column indices for a point P'(x, y) in region 682 are sought, the x value is negative relative to the point of origin 690, and may be sign-inverted to obtain a corresponding location P'(-x, y) within region 681. The environment map indices stored in a look-up table corresponding to region 681 may be read and the sign of the column offset negatived in order to provide environment map indices that would have been stored if region 682 had been mapped. Similarly, if row and column indices for a point P'(x, y) in region 683 are sought, the y value is negative relative to the point of origin 690, and may be sign-inverted to obtain a corresponding location P'(x, -y) within region 681. The environment map indices stored in the look-up table corresponding to region 681 may be read and the sign of the row offset negatived in order to provide environment map indices that would have been stored if region 683 had been mapped. Finally, when row and column indices for a point P'(x, y) in region 684 is sought, both the x an y values are negative relative to the point of origin 690, and may be sign-inverted to obtain a corresponding location P'(-x, -y) within region 682. The signs of both the row and column offsets read from the look-up table are accordingly inverted. In this way, separate mapping of regions 682–684 is avoided and the necessary indices for those regions are instead obtained from regions 681. The relationship between the coordinates (x, y) of the seven regions 682–688 and the mapped region 681 are shown in FIG. 6E.

The mapping described above holds for surfaces of revolution which are symmetrical about an equatorial axis, including spheres, cylinders, and sine distributions. For surfaces that are not symmetrical about an equatorial axis, such as vases, regions above and below the equatorial axis must be mapped.

Mapping a Viewing Plane to a Cylindrical Look-up Table

Figure 7A:
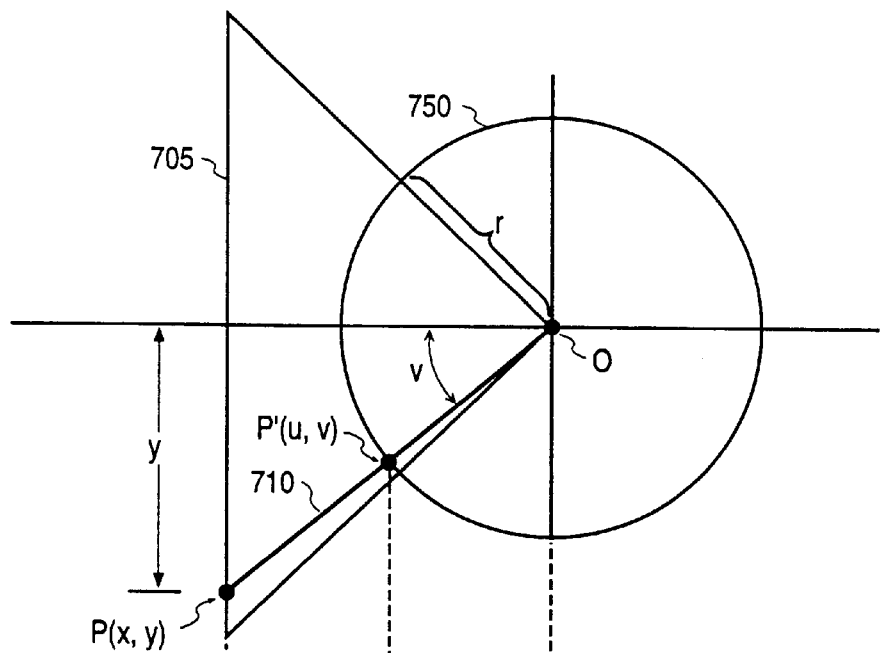
FIG. 7A depicts a side view of a cylinder and a viewing plane to illustrate the geometrical relationship between the "y" offset in the viewing plane and an angle of rotation about the cylindrical axis.
Figure 7B:
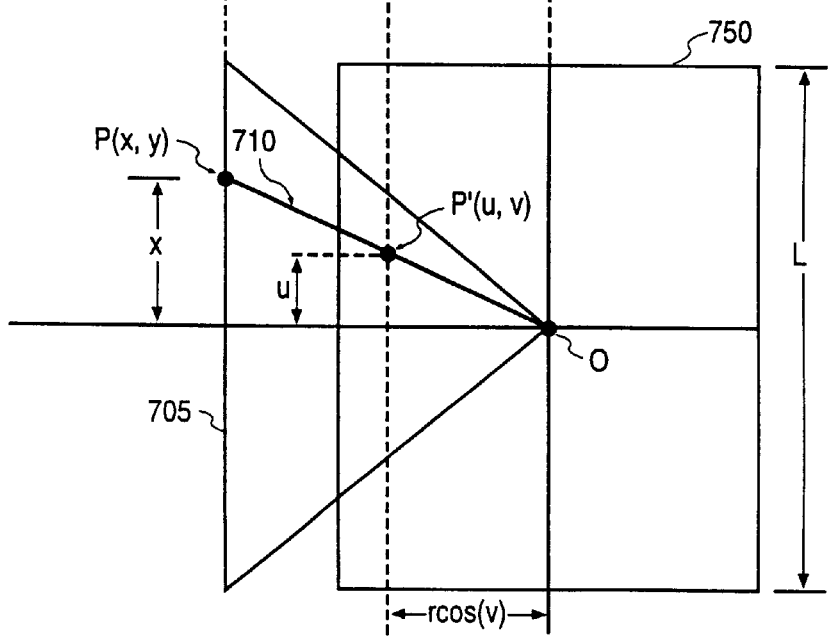
FIG. 7B depicts a top view of a cylinder and a viewing plane to illustrate the geometrical relationship between the "x" offset in the viewing plane and an offset along the length of the cylinder.

The geometry by which a viewing plane 705 is mapped to an exemplary cylindrical look-up table is shown in FIGS. 7A and 7B. FIG. 7A depicts a side view of a cylinder 750 (looking into the cylindrical axis) and FIG. 7B depicts a plan view of the cylinder 750. A direction vector 710 extending from perspective viewpoint O to a point P(x, y) in the viewing plane 705 intersects a corresponding point P'(u, v) on the surface of cylinder 750. As stated in reference to FIG. 6C, each point on the surface of the cylinder 750 corresponds to a location within the cylindrical look-up table, so that look-up table coordinates of point P'(u, v), once determined, allow the corresponding point P(x, y) in the viewing plane to be mapped to the cylindrical look-up table. The scanline offset into the look-up table is related to angle v by: scanline offset=r * v, where r is the cylindrical radius. By normalizing the cylindrical radius, the scanline offset is reduced simply to coordinate v. Referring now to FIG. 7A, angle v may be obtained from viewing plane coordinate y and from distance d as follows:

$$v = \tan^{-1}(y/d)$$

where distance d is the distance between the perspective viewpoint O and the viewing plane 705 and is determined by the user-specified zoom angle. As the zoom angle is decreased, narrowing the field of view presented to the user, distance d is increased. Thus, as the user zooms in on an area of interest, the viewing plane moves further from the viewpoint O and closer to the area of interest, while zooming out results in the opposite effect.

In the preferred embodiment, the v coordinate is normalized, so that it ranges from 0 to 1, and then multiplied by the height of the cylindrical look-up table. The v coordinate, which represents the scanline offset within the cylindrical look-up table, is dependent only upon the y coordinate of the point within the viewing plane. This is a consequence of the scanline coherence between the viewing plane and the cylindrical look-up table. A given scanline within the viewing plane will have a fixed y coordinate and will therefore map to a single scanline within the cylindrical look-up table according to the computed v coordinate. In the preferred embodiment, the single scanline to which the viewing plane scanline is mapped may be a composite scanline obtained by interpolating between the two scanlines having v coordinates bounding the v coordinate computed based on the y coordinate of the viewing plane scanline.

Look-up table offset u (i.e., the offset of a given entry in a scanline from a reference point within the scanline) now may be computed based on look-up table scanline offset v, viewing plane coordinate x, the constant cylindrical radius r and distance d as follows:

$$u = x * r * \cos(v) / d$$

In the preferred embodiment, coordinate u is normalized, so that it ranges from 0 to 1, and then multiplied by the width of the cylindrical look-up table. Based on the foregoing expressions, points P(x, y) within the perspective viewing plane, may be mapped to entries within the cylindrical look-up table. Notice that d and r are constant (although d may be changed for successive views) and v is constant for a given scanline. Consequently, look-up table offset u is related to viewing plane coordinate x by a simple constant of proportionality and the pixel locations along a given scanline of the viewing plane may be mapped to entries along a scanline in the cylindrical look-up table by a scaling factor. The scaling factor, though independent of the pitch and yaw of the perspective view, will be different for each scanline in the viewing plane. In order to avoid calculating these scaling factors for every rendering of a perspective view, a look-up table can be precomputed to store the scale factors for each of the viewing plane scanlines to be mapped to the cylindrical look-up table. It will be appreciated that the scale factors used to map scanlines of the viewing plane to scanlines of the cylindrical look-up table will increase and decrease according to the zoom value of the perspective view.

Notice that the zoom out distance d of FIGS. 7A and 7B is limited by the maximum field of view provided by the cylindrical look-up table. Referring briefly back to FIG. 6A, as mentioned above, the angle 2*δ of is the maximum field of view which can be presented from a given perspective using the cylindrical look-up table. Angle 2*δ is determined by the cylindrical length L (shown in FIG. 7B). Consequently, a cylindrical look-up table based upon a cylinder having a relatively large length permits a relatively wide field of view, and a cylindrical look-up table based upon a cylinder having a relatively small length permits a relatively narrow field of view. Also, for a look-up table occupying a fixed memory space, field of view is inversely proportional to the sampling of the surface points (resolved to environment map indices) which may be contained. In the preferred embodiment, therefore, it is desirable to provide at least two cylindrical look-up tables for rendering an environment map and switching between the two based upon the zoom value specified. For zoom out requiring a field of view greater than a threshold angle (e.g., 60°), a first cylindrical look-up table providing wider field of view is referenced, while for zoom in requiring a field of view less than or equal to the threshold angle, a second cylindrical look-up table providing greater resolution is referenced. An alternate embodiment of the present invention having a greater or lesser number of cylindrical look-up tables would not depart from the spirit and scope of the present invention.

It will be appreciated that computation of look-up table entry coordinates (u, v) based on the expressions above will often result in fractional values. In the preferred embodiment of the present invention, the fractional component is maintained (as the least significant 16-bits of a 32-bit fixed point value for example) and used to interpolate between environment map indices read from the cylindrical look-up table. This provides a measure of anti-aliasing of images rendered onto the display. As described below, interpolation is used in other aspects of the present invention to achieve further anti-aliasing.

Mapping a Viewing Plane to a Non-cylindrical Look-up Table

Figure 8A:
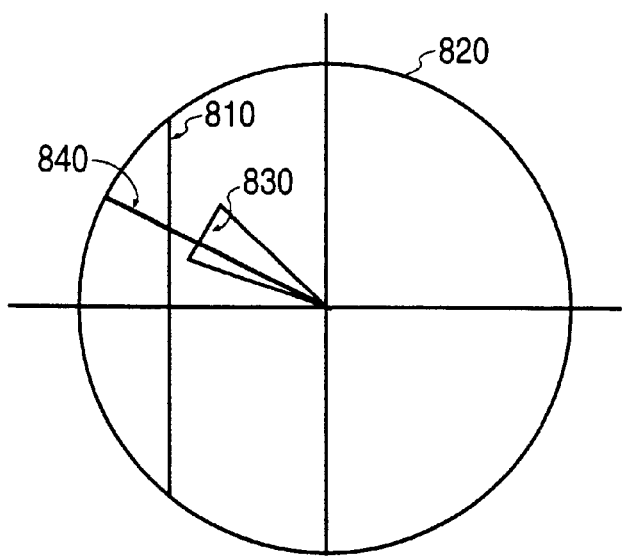
FIG. 8A depicts a side view of a planar surface representing a scanline-coherent look-up table and its geometric relationship to a spherical environment map and a viewing plane.

As stated above, a look-up table containing environment map indices may be based on any surface of extrusion (or portion thereof) having an axis of extrusion parallel to scanlines in the viewing plane. An axis of extrusion is one lying in the direction of extrusion. FIG. 8A depicts a side view of a planar look-up table 810 and its relationship with a spherical environment map 820 and a viewing plane 830. Scanlines in the viewing plane 830 are parallel to storage rows ("scanlines") in the planar look-up table 810 so that the planar look-up table constitutes a cylindrical look-up table. The viewing plane 830 is mapped to the planar look-up table by computing the projection of viewing plane scanlines onto the planar look-up table 810 along projection paths such as 840. Scaling factors can then be computed for each viewing plane scanline to map individual pixel locations in the viewing plane scanlines to entries in the planar look-up table 810. This process is similar to that described above for mapping a viewing plane to a cylindrical look-up table. The scaling factors used to map viewing plane scanlines to the planar look-up table need to be recomputed whenever the pitch angle or zoom angle of the view changes. However, since only one scaling factor per viewing plane scanline need be computed, the computational cost is insignificant relative to the overall cost of loading pixel values into the viewing plane.

Figure 8B:
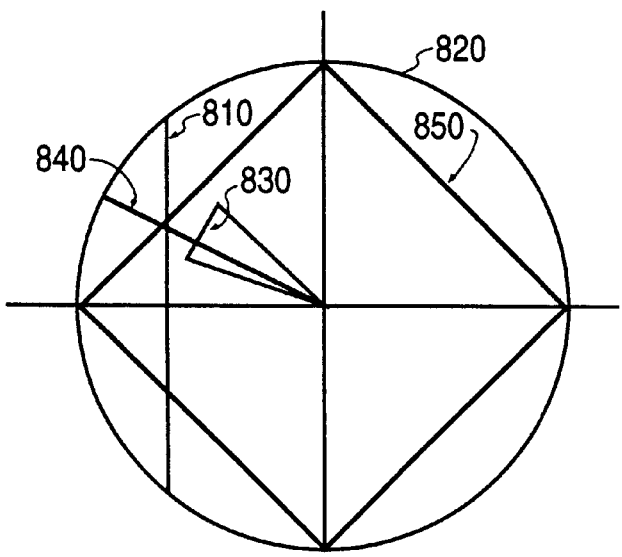
FIG. 8B depicts a side view of a diamond-shaped surface of extrusion representing a scanline-coherent look-up table and its geometric relationship to a spherical environment map and a viewing plane.

It will be appreciated that the planar look-up table 810 does not permit views of the scene beyond a threshold pitch angle (e.g., 90° from the horizontal). Beyond the threshold pitch angle the projections of viewing plane scanlines no longer intersect the planar look-up table. A surface of extrusion such as that depicted in FIG. 8B, an extruded diamond shape 850, allows a full vertical rotation of the viewing plane. Scanlines in the viewing plane 830 are still parallel to the axis of extrusion so a look-up table based on the extruded shape 850 is a scanline-coherent look-up table. The mapping of environment map indices into the look-up table is computed in a manner similar to that described for the planar look-up table.

Anti-Aliasing

Anti-aliasing is a rendering technique which enhances the quality of an image. Among other things, anti-aliasing is used to eliminate the "stair-step" effect that results when rendering diagonal lines. Using anti-aliasing techniques, a jagged diagonal line may be rendered as a clean line. Anti-aliasing typically involves filtering adjacent pixels to avoid abrupt changes in pixel value. In the preferred embodiment, anti-aliasing is performed during the mapping of the viewing plane to the scanline-coherent look-up table, referred to as index interpolation, and again to produce composite pixel values from environment map data, referred to as pixel interpolation.

Index Interpolation

Figure 9:
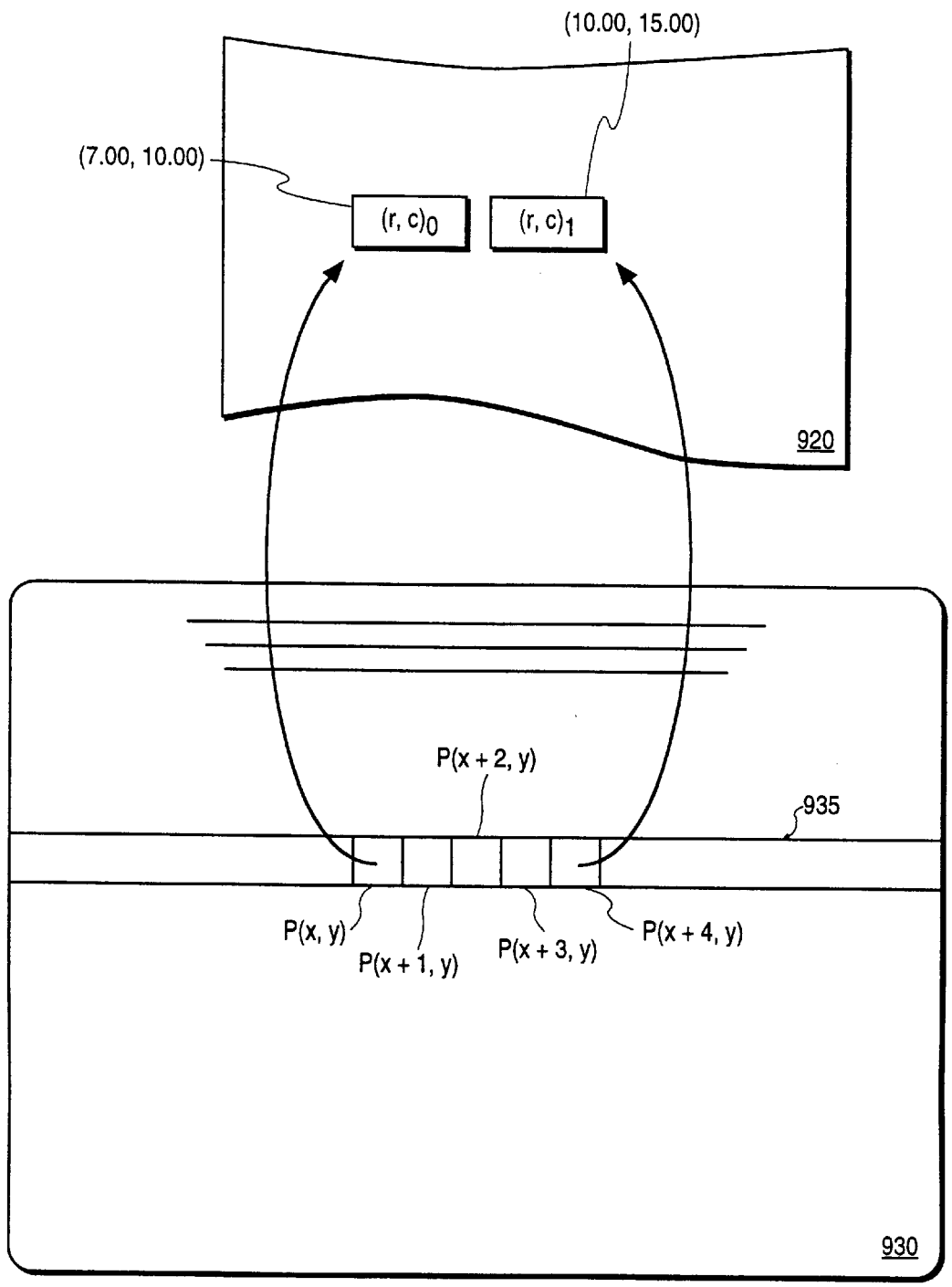
FIG. 9 illustrates the manner in which environment map indices obtained from a scanline-coherent look-up table are interpolated to generate additional environment map indices for intermediate viewing plane pixels.

FIG. 9 illustrates a technique for interpolating between environment map indices read from a scanline-coherent look-up table 920 to provide additional anti-aliasing. FIG. 9 depicts a viewing plane 930 having a scanline 935 containing five successive pixels designated P(x, y), P(x+1, y),... P(x+4, y). In the preferred embodiment, rather than reading environment map indices from the look-up table 920 for each the five viewing plane pixels, environment map indices are read from the look-up table only for every fourth viewing plane pixel; in this example, pixels P(x, y) and P(x+4, y). Environment map indices for intervening pixels P(x+1, y), P(x+2, y) and P(x+3, y) are obtained by interpolating between the environment map indices (r, c)$_0$ and (r, c)$_1$ read for pixels P(x, y) and P(x+4, y), respectively. Note that in addition to providing a measure of anti-aliasing, index interpolation also permits the size of the scanline-coherent look-up table to be significantly decreased. It will be appreciated that, while the environment map indices have here been referred to as row and column values, any number of environment map addressing schemes may be used.

Pixel Interpolation

Figure 10:
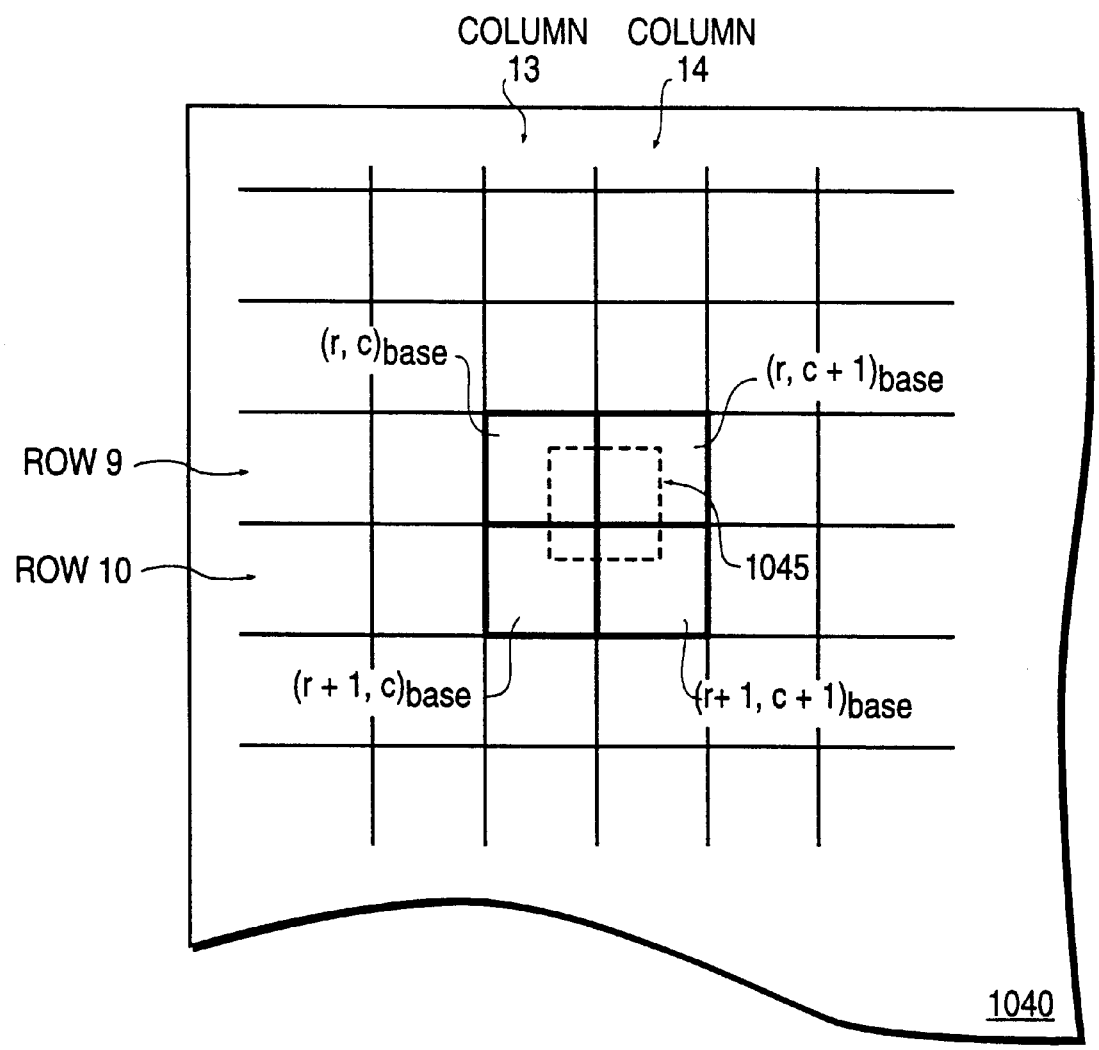
FIG. 10 illustrates the manner in which pixel values are interpolated to obtain a composite pixel value.

FIG. 10 illustrates a way that fractional row and column indices may be used to interpolate between pixel values read from an environment map 1040 (hence color indexing) to provide further anti-aliasing. Once an environment map index pair has been resolved to a specific environment map row and column (r, c) by way of obtaining an index pair from a scanline-coherent look-up table (or computing the index pair based on values read from the look-up table as described in reference to FIG. 9) and offsetting the column index based on a yaw angle, a group of pixel values corresponding to the (r, c) location within the environment map 1040 may be identified. For example, suppose that the value to be loaded into the pixel buffer is located at (r, c)=(9.25, 13.75) (shown as dotted box 1045). A base pixel value can be located based on the integer-truncated values of the (r, c) pair, that is pixel value at (r, C)base=(9, 13). From this base pixel value, three adjacent pixel values can be located at (r+1, c)$_{base}$, (r, c+1)base, (r+1, c+1)base. Notice that the four located pixel values encompass the pixel value located at the fractional address and shown by a dotted pixel location 1045 in FIG. 10. By interpolating among the four located pixel values based on the fractional component of the original (r, c) pair, a composite pixel value may be computed and written to a viewing plane for display. Herein, the fractional portion of the row coordinate of the original (r, c) pair is referred to as a row fractional component and the fraction portion of the column coordinate of the original (r, c) pair as a column fractional component.

It will be appreciated that the anti-aliasing techniques described above may significantly increase the number of processor operations required to render a perspective view onto the display. Depending on the computational power of the system rendering the perspective view, lookup table and environment map interpolation may noticeably reduce the rate at which views are updated. In the preferred embodiment, therefore, index and pixel interpolation may be dynamically enabled or disabled based on user actions or statically enabled or disabled by user-specified control settings. For example, in a mode in which anti-aliasing is normally performed, detection of rapid changes in pitch and yaw angle (indicating that the user desires to quickly pan about the scene) may result in temporary disabling of the anti-aliasing functions in favor of more rapid view rendering.

Non-Rectangular Environment Maps

Figure 11A:
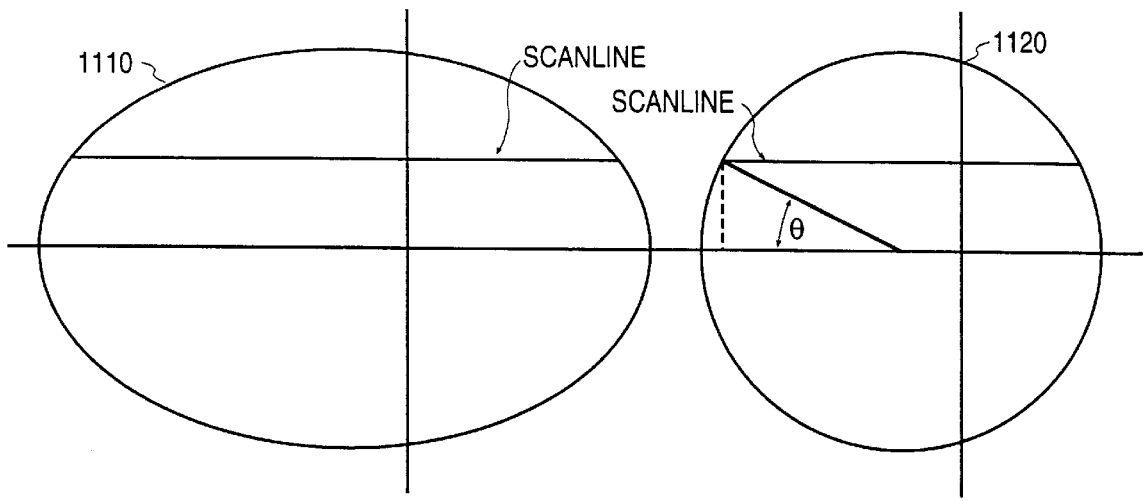
FIG. 11A depicts an elliptical environment map.
Figure 11B:
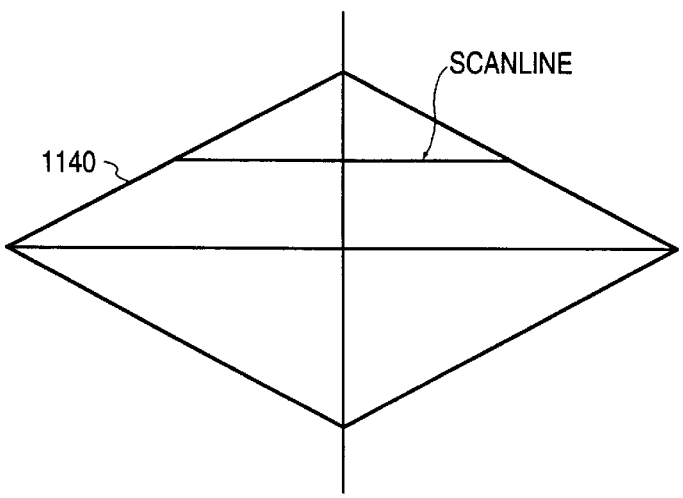
FIG. 11B depicts a diamond-shaped environment map.

Although environment maps are often composed of scanlines of uniform length, this is not necessary and instead different scaling factors can be applied to the scanlines of an environment map thereby producing a non-rectangular map. FIG. 11A, for example, depicts an elliptical environment map 1110 in which the scanlines are scaled by factor cos θ, where θ is the pitch angle of each scanline. This makes the width of each scanline proportional to the circumference of a sphere 1120 sliced at different pitch angles. In the present invention environment maps in which scanlines are individually scaled can be accommodated by storing environment map indices in which the scale factor is applied to the row offset coordinate: (scale factor * φ, θ). For example, the environment map 1110 could be rendered using a scanline-coherent look-up table containing environment map indices (cos (θ) * φ, θ). FIG. 11B depicts a diamond shaped environment map 1140 that can be rendered by storing values obtained from the expression ((1- absolute (θ/(π/2))) * φ, θ) in a scanline-coherent look-up table.

A method and apparatus for rendering perspective views of a scene using a scanline-coherent look-up table are thus described.

I claim:

1. A method for presenting a perspective view of a scene on a display, the scene being represented by an environment map having a plurality of pixel values stored therein, the environment map being based on a projection of the scene onto a first surface geometry, the method comprising:

retrieving indices to the environment map from a look-up table that has been generated by mapping coordinates in the first surface geometry to a second surface geometry having an axis of extrusion parallel to scanlines in the perspective view, wherein the second surface geometry is not a planar surface geometry;

determining pixel values in a portion of the environment map based on the indices; and illuminating a display based on the pixel values.

2. A system for presenting a perspective view of a scene on a display, the scene being represented by an environment map having a plurality of pixel values stored therein, the environment map being based on a projection of the scene onto a first surface geometry, the system comprising:

a table processor retrieving indices to the environment map from a look-up table that has been generated by mapping coordinates in the first surface geometry to a second surface geometry having an axis of extrusion parallel to scanlines in the perspective view, wherein the second surface geometry is not a planar surface geometry;

an array manager determining pixel values in a portion of the environment map based on the indices; and a graphics renderer illuminating a display based on the pixel values.

3. A method for image manipulation of an image projected onto a first surface having a first geometry, the method comprising:

mapping said first surface onto an intermediate surface, which intermediate surface is a second surface having a second geometry different from said first geometry, wherein the second geometry is not a planar geometry; and mapping a viewing surface onto said intermediate surface for determination of pixel values of said viewing surface to represent at least a portion of said image.

4. The method of claim 3 and wherein navigation based on said mapping said viewing surface onto said intermediate surface is simpler than navigation based on mapping said viewing surface onto said first surface, for navigation in at least one direction.

5. A system for image manipulation of an image located on a first surface having a first geometry, the system comprising:

a presentation processor mapping said first surface onto an intermediate surface, which intermediate surface is a second surface having a second geometry different from said first geometry, wherein the second geometry is not a planar geometry; and a view processor mapping a viewing surface onto said intermediate surface for determination of pixel values of said viewing surface to represent at least a portion of said image.

6. The system of claim 5 and wherein navigation based on mapping said viewing surface onto said intermediate surface is simpler than navigation based on mapping said viewing surface onto said first surface, for navigation in at least one direction.

7. A method for image pre-manipulation of an image projected onto a first surface having a first geometry, the method comprising:

selecting an intermediate surface, which intermediate surface is a second surface having a second geometry different from said first geometry, wherein the second geometry is not a planar geometry; and mapping said first surface onto said intermediate surface.

8. A system for image pre-manipulation of an image located on a first surface having a first geometry, the system comprising:

an intermediate surface selector selecting an intermediate surface which is a second surface having a second geometry different from said first geometry, wherein the second geometry is not a planar geometry; and a processor mapping said first surface onto said intermediate surface.

* * * * *